(12) United States Patent
Dyer (10) Patent No.: US 8,242,430 B2
(45) Date of Patent: Aug. 14, 2012

(54) APPARATUSES AND METHODS THAT REDUCE MISMATCH ERRORS ASSOCIATED WITH ANALOG SUBTRACTIONS USED FOR LIGHT SENSING

(75) Inventor: Kenneth C. Dyer, Davis, CA (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 12/987,394

(22) Filed: Jan. 10, 2011

(65) Prior Publication Data

US 2012/0049048 A1    Mar. 1, 2012

Related U.S. Application Data

(60) Provisional application No. 61/376,638, filed on Aug. 24, 2010.

(51) Int. Cl.
*H03F 3/08* (2006.01)
*G01J 1/44* (2006.01)
*G01J 1/32* (2006.01)

(52) U.S. Cl. ............... 250/214 R; 250/214 AL; 250/205

(58) Field of Classification Search ............ 250/214 AL, 250/214.1, 214 R, 205, 214 A, 214 B, 338.1, 250/339.02, 214 C, 214 DC, 221; 340/540, 340/555, 600, 870.21, 146.2; 345/207; 356/350; 348/602, 603; 330/257, 288; 327/53, 66, 327/490, 514
See application file for complete search history.

(56) References Cited

U.S. PATENT DOCUMENTS

| | | | |
|---|---|---|---|
| 4,606,637 A * | 8/1986 | Geen ........................... 356/472 |
| 4,920,257 A | 4/1990 | Fuerthbauer | |
| 5,534,827 A * | 7/1996 | Yamaji ........................ 332/103 |
| 6,141,169 A * | 10/2000 | Pietruszynski et al. ......... 360/67 |
| 7,538,705 B2 * | 5/2009 | Deval et al. ................... 341/143 |
| 2008/0006762 A1 | 1/2008 | Fadell et al. | |
| 2008/0217516 A1 * | 9/2008 | Suzuki et al. ............. 250/214 A |
| 2008/0237669 A1 * | 10/2008 | Yanagisawa et al. ......... 257/292 |

FOREIGN PATENT DOCUMENTS

JP    2008-099039    4/2008

OTHER PUBLICATIONS

Widrow, et al. Adaptive Signal Processing. Englewood Cliffs, NJ: Prentice-Hall, pp. 302, 1985, last accessed Apr. 9, 2011.
Hansen et al. "Pulse-based Interface Circuits for SPR Sensing Systems," IEEE, International Symposium on Circuits and Systems Kobe, Japan, May 2005.
European Search Report for European Application No. 11178156, dated Jan. 19, 2012.

* cited by examiner

*Primary Examiner* — Que T Le
*Assistant Examiner* — Jennifer Bennett
(74) *Attorney, Agent, or Firm* — Fliesler Meyer LLP (57) ABSTRACT

A system and method for adaptive analog infrared subtraction during ambient light sensing is provided. The system employs a current mirror circuit to perform an analog subtraction of currents ($I_{IR}$ and $I_{IR+AB}$) obtained from photodiodes. An ADC is employed to digitize the output signal from the current mirror and, the digitized signal is amplitude modulated at a chop frequency utilized by the current mirror. Further, a digital filer is employed to generate an adjustment signal by filtering the modulated signal and the gain of the current mirror is calibrated by employing the adjustment signal. Moreover, as the adjustment signal converges to a value indicative of the mismatch error of the current mirror, the output signal of the current mirror provides an accurate value of ambient light incident on the photodiode.

19 Claims, 9 Drawing Sheets

APPARATUSES AND METHODS THAT REDUCE MISMATCH ERRORS ASSOCIATED WITH ANALOG SUBTRACTIONS USED FOR LIGHT SENSING

CROSS REFERENCE TO RELATED APPLICATIONS

This application claims priority to U.S. Provisional Patent Application Ser. No. 61/376,638, filed on Aug. 24, 2010, and entitled "ADAPTIVE ANALOG INFRARED SUBTRACTION CIRCUIT FOR AN AMBIENT LIGHT SENSOR," the entirety of which is incorporated by reference herein.

BRIEF DESCRIPTION OF THE DRAWINGS

The numerous embodiments and advantages of the present invention will be apparent upon consideration of the following detailed description, taken in conjunction with the accompanying drawings, in which like reference characters refer to like parts throughout, and in which.

DETAILED DESCRIPTION OF THE INVENTION

A category of monolithic devices is emerging that allows electronic products to sense their environment. These include diverse devices, such as, accelerometers, monolithic gyroscopes, light sensors and imagers. In particular, light sensors are one of the simplest and cheapest, allowing their inclusion in multitudes of consumer products, for example, nightlights, cameras, cell phones, laptops etc. Typically, light sensors can be employed in a wide variety of applications, such as, but not limited to, detecting the amount of ambient light for the purpose of controlling power, displays, or other interface options. For example, ambient light sensors are included in laptops to sense the ambient light, allowing for adjustment of the screen's backlight to comfortable levels for the viewer. In another example, an ambient light sensor can be employed in a cell phone to reduce the display power based on the surrounding ambient light, such that battery life can be extended.

Photodiodes are used in light sensor apparatus to detect the presence and intensity of light of varying wavelengths (e.g., ambient or infrared light). For these apparatus, it is important to distinguish between two different ranges of wavelengths of light—ambient light and infrared light. According to an embodiment, circuitry having two photodiodes with optical filters is used in conjunction to distinguish these ranges: one diode/filter pair for detecting visible and infrared light and the other diode/filter pair for detecting only infrared light. By subtracting the infrared detecting signal current from the ambient/infrared detecting signal current, the ambient signal current can be isolated. Systems and methods disclosed herein provide an improved analog subtraction circuit is described that subtracts current from the infrared detecting signal current from the ambient (e.g., visible) light/infrared detecting signal current. Moreover, the improved analog subtraction circuit employs a current mirror circuit, whose gain can be adjusted to compensate for mismatch, by filtering an amplitude modulated signal in the digital domain. The subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the subject matter may be practiced without these specific details. In other instances, well-known structures and devices are shown in block diagram form in order to facilitate describing the subject innovation.

Moreover, the word "exemplary" is used herein to mean serving as an example, instance, or illustration. Any aspect or design described herein as "exemplary" is not necessarily to be construed as preferred or advantageous over other aspects or designs. Rather, use of the word "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. In addition, the word "coupled" is used herein to mean direct or indirect electrical or mechanical coupling. Further, the term "ambient" employed herein can refer to light of most any reasonable spectrum, such as, but not limited to, incandescent light, fluorescent light, sunlight, any black-body temperature, and/or a combination thereof.

Figure 1:
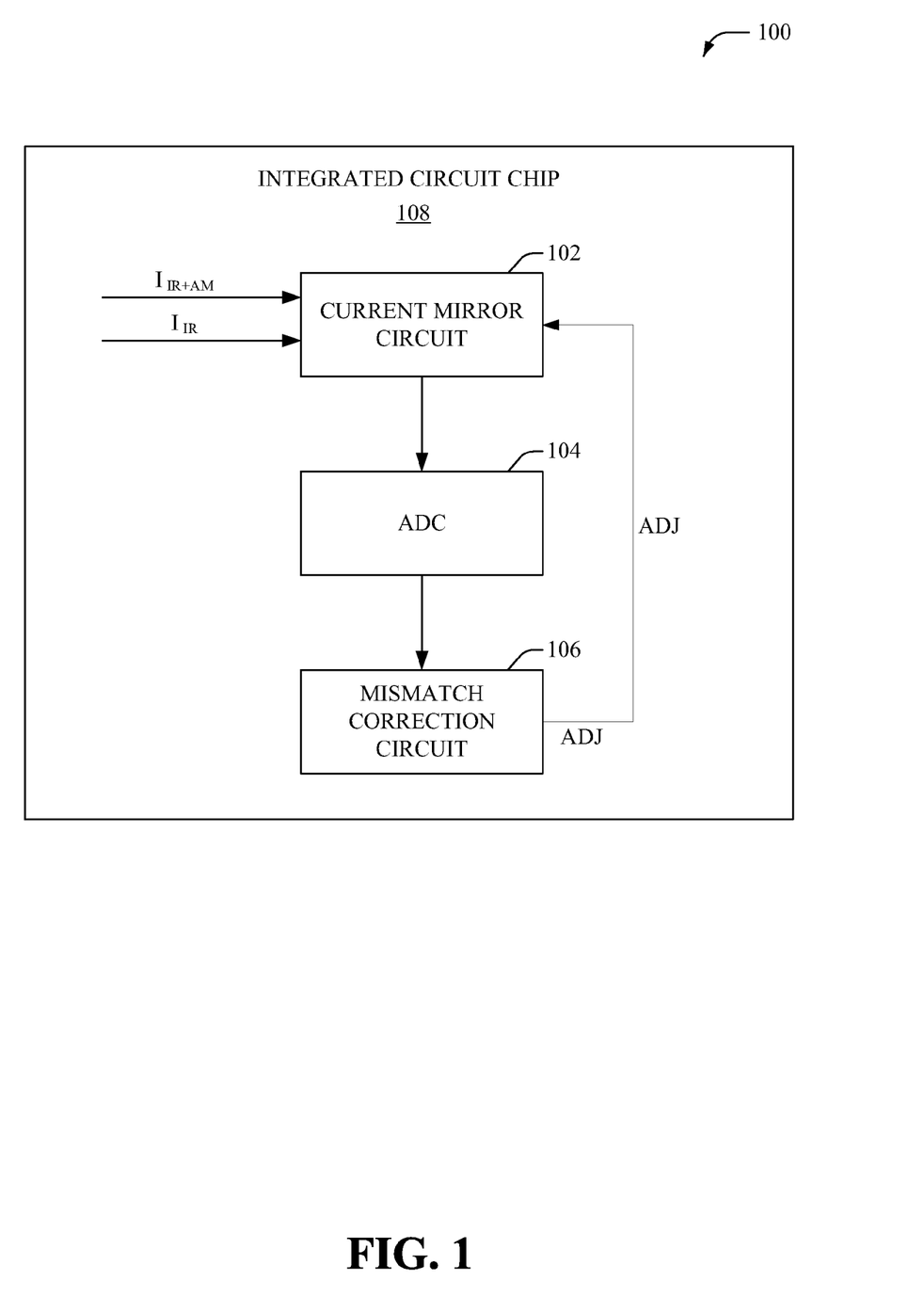
FIG. 1 illustrates an exemplary system for accurately detecting ambient light by employing an adaptive analog infrared (IR) subtraction circuit.

FIG. 1 illustrates an example system 100 for accurately detecting ambient light by employing an adaptive analog infrared (IR) subtraction circuit, according to an aspect of the subject disclosure. Moreover, the system 100 facilitates calibration of current mirrors to reduce or eliminate any error introduced due to a mismatch in one of the current mirrors that would otherwise limit the maximum sensitivity of the light sensor. In general, system 100 can be employed in most any light sensing application. For example, a laptop or personal computer can employ system 100 to adjust the brightness of its display based on the ambient light in the room. In another example, a cell phone or personal digital assistant (PDA) can decrease the brightness of its display to conserve battery life, when sufficient ambient light is detected.

In one embodiment, system 100 performs analog subtraction using two photodiode currents, by employing a current mirror circuit 102. Moreover, the current mirror circuit receives a current ($I_{IR}$) indicative of the IR light incident on a first photodiode and a current ($I_{IR+AM}$) indicative of the sum of the IR light and ambient light incident on a second photodiode. Although the subject specification describes circuits measuring/employing IR light, it can be appreciated that light of most any wavelength can be measured/employed and further it can be appreciated that the subject innovation can also be utilized to adjust gain of current mirror circuit that does not employ light. According to an aspect, the current mirror circuit 102 is "chopped", wherein the chop signal typically operates at a rate higher than a sampling rate of analog-to-digital convertor (ADC) 104. However, the output of current mirror circuit 102 can include an error due to the imperfections in the gain of the current mirror 102, for example, caused by manufacturing variations. Ideally, the gain of the current mirror 102 is set as "−1", however the gain can vary randomly (e.g. greater or less than −1) based on manufacturing process variations associated with the components of the current mirror 102. Typically, the magnitude of the gain is $(1 \pm \Delta)$, wherein $\Delta$ is the mismatch error. The sign (positive or negative) of the mismatch error depends on state of a chop signal utilized in the current mirror circuit 102. As an example, the magnitude of the mismatch error depends on manufacture and is made worse at low light levels, due to poor sub-threshold matching. Theoretically, since the gain of the mirror is "−1", only the signal relating to visible ambient light ($I_{AM}$) remains at the output of the current mirror circuit 102. However, in practice, the mismatch error is added to the output signal.

The ADC 104 is employed to convert the analog output signal from the current mirror circuit 102 to a digital signal. In traditional systems (e.g., which do not include a mismatch correction circuit 106), the ADC 104, digitizing the output of the analog current mirror circuit 102, processes two signals, one desired and the other related to the mismatch. The presence of the non-ideal mismatch signal reduces the dynamic range of the ADC, therefore reducing the light-sensors maximum sensitivity. The mismatch signal also adds system noise that provides additional errors. However, the subject system 100 employs a mismatch correction circuit 106 that identifies the mismatch error in the digital domain and adjusts the gain of the current mirror circuit 102 to compensate for the error.

According to an embodiment, the mismatch correction circuit 106 detects the mismatch error based on the frequency content in the digitized signal. For example, the mismatch correction circuit 106 can perform amplitude modulation to determine a tone at chop frequency that is proportional to the mismatch error. Further, a digital filter (e.g., a low pass filter, integrator, etc.) inputs the amplitude modulated signal and generates an adjustment signal "ADJ", which has a sign and magnitude proportional to the mismatch error. The ADJ signal at the output of the digital filter can be converted to an analog signal (e.g., by employing most any digital-to-analog converter (DAC), as shown infra in FIG. 2) and utilized to fine-tune the gain of the current mirror circuit 102. In an aspect, the gain of the current mirror circuit 102 can be changed by switching in and out mirror elements as directed by the ADJ signal. The servo loop formed, detects the signal at the chop frequency signal, drives its amplitude to a minimum, and thus eventually eliminates the mismatch error from the output of the current mirror circuit 102. Typically, gain calibration by the mismatch correction circuit 106 can be performed at most any time, such as, but not limited to, during normal operation of the part, during power-up, in the background, periodically, or when requested by the user. Additionally or alternately, the calibration can also be performed during product testing and employed to set fuses at manufacture.

It can be appreciated that the mechanical design of system 100 can include different component selections, component placement, dimensions, optical filters, etc., to achieve an optimal ambient light sensing current at the output of the current mirror circuit 102. Further, it can be appreciated that the current mirror circuit 102, the ADC 104, and the mismatch correction circuit 106, can include most any electrical circuit (s) that can include components and circuitry elements of any suitable value in order to implement the embodiments of the subject innovation. Furthermore, although the current mirror circuit 102, the ADC 104, and the mismatch correction circuit 106, are shown to be implemented on a single integrated circuit (IC) chip 108, it can be appreciated that the subject innovation is not so limited and that system 100 can also be implemented on multiple ICs.

Figure 2:
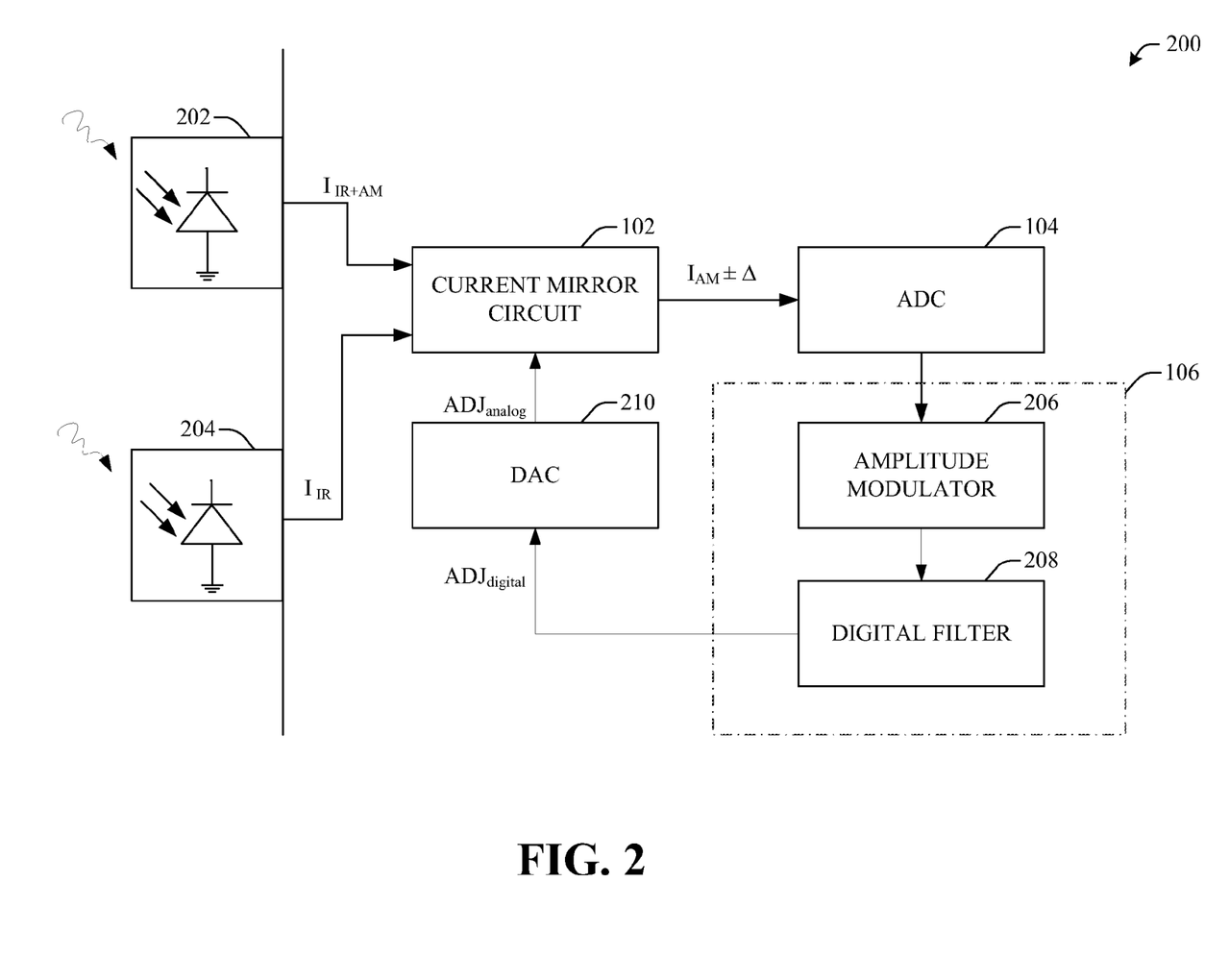
FIG. 2 illustrates an exemplary system for calibrating the gain of a current mirror circuit during ambient light sensing.

Referring now to FIG. 2, there illustrated is an example system 200 for calibrating the gain of a current mirror circuit during ambient light sensing in accordance with an aspect of the subject specification. It can be appreciated that the current mirror circuit 102, the ADC 104, and the mismatch correction circuit 106, can include functionality, as more fully described herein, for example, with regard to system 100. Typically system 200 can include photodiodes 202 and 204, that detect both ambient and IR light. As an example, optical filters (not shown) are used in conjunction with the photodiodes 202 and 204, such that photodiode 202 detects both visible (e.g., ambient) and IR light and the photodiode 204 detects only IR light (or vice versa). In one example, a CMOS light detector, configured to detect specific wavelengths of light, which includes two sensors that employ disparate colored filter layers can be utilized as described in detail by US Patent Publication, Serial No. 2008/0191298 A1, filed on Mar. 14, 2007, and entitled "AMBIENT LIGHT DETECTORS USING CONVENTIONAL CMOS IMAGE SENSOR PROCESS," the entirety of which is incorporated by reference herein.

In another example, system 200 can include a light sensor comprising a layer of a first conductivity type, and first and second regions of a second conductivity type in the layer of the first conductivity type, wherein the first region of the second conductivity type and the layer of the first conductivity type form a first PN junction photodiode (e.g., 202), and wherein the second region of the second conductivity type and the layer of the first conductivity type form a second PN junction photodiode (e.g., 204). At least one further layer intrinsic to CMOS technology can cover the second region of the second conductivity type (but not the first region of the second conductivity), wherein the at least one further layer blocks visible light while allowing at least a portion of infrared (IR) light to pass therethrough. Carriers are produced in the layer of the first conductivity type when light, including both visible light and IR light, is incident on the light sensor. A portion of the carriers produced due to the visible light and the IR light incident on the first region of the second conductivity type are captured by the first region of the second conductivity type and contribute to a first photocurrent that is indicative of both the visible light and the IR light. A further portion of the carriers, produced due to the IR light that passes through the at least one further layer, are captured by the second region of the second conductivity type and contribute to a second photocurrent that is indicative of the IR light. The above example light sensor is described in detail by U.S. Pat. No. 7,755,117 B2 dated Jul. 13, 2010, and filed on Jan. 9, 2007, and entitled "LIGHT SENSORS WITH INFRARED SUPPRESSION," the entirety of which is incorporated by reference herein.

In general, when photons bombard the junction of the photodiodes (202, 204), current is produced. For optimal use, the diodes are reverse-biased and the amount of bias directly translates into quality of operation. For example, a larger reverse bias can enhance speed and linearity while also increasing dark current and shot noise. Moreover, light will create forward current, subtracting from the reverse bias current. It can be appreciated that most any additional circuitry (not shown) can be added to linearize the photodiode's I-V curve, to amplify the signal, and/or to allow a disable function. Moreover, the signal current ($I_{IR+AM}$) generated by photodiode 202 and the signal current ($I_{IR}$) generated by photodiode 204 can be subtracted to extract a current value that is proportional to the ambient light. According to an aspect, the current mirror circuit 102 is utilized for the subtraction in the analog domain. In an alternative system (not shown), both photodiode currents can be digitized separately or sequentially in time, and a digital subtraction can be performed. However, analog subtraction is superior to digital subtraction, since it is faster, requires less on-chip hardware, and reduces required dynamic range of the ADC 104. Moreover, in the digital approach, the dynamic range of the ADCs must be large enough to digitize both the infrared and ambient light signals simultaneously. In contrast, the range of the ADC 104 predominantly consists of the only the ambient light current and the ADC 104 does not have to process a large infrared current (e.g., such as if the subtraction were to be done after the ADC). Additionally, the analog subtraction technique is instantaneous, does not require two ADCs, or two sample periods, and is not subject to quantization noise. However, for an accurate analog subtraction, the gain of the current mirror circuit has to be calibrated to compensate for mismatch error ($\pm\Delta$).

In this regard, system 200 employs a feedback loop that utilizes modulation to detect the mismatch error signal at the chopper frequency and adapts the gain of the current mirror circuit 102, such that, the error signal at the chopper frequency is minimized. This improves the dynamic range of the analog-subtraction system by cancelling the error due to manufacturing variations in the current mirror circuit 102. Moreover, the mismatch correction is critical since metal-oxide-semiconductor (MOS) transistor circuits in the current mirror circuit 102 do not match well with very small currents. According to an aspect, the feedback loop includes an amplitude modulator 206 that identifies the imperfections in the analog subtraction (e.g., by current mirror circuit 102) by modulating the output of the ADC 104 by the chopper signal. The modulated output can then be filtered by a digital filter 208, for example, a digital low-pass filter, integrator, etc. As an example, the digital filter 208 can have an infinite DC gain maximizing performance of the feedback loop. Moreover, the output of the digital filter 208 is then utilized to adjust the gain of the current mirror until the mismatch error signal is minimized and/or eliminated. The feedback loop can be constructed as a foreground/on-demand calibration, power-up calibration, background calibration and/or done at final test.

According to an aspect, the output signal ($I_{AM}\pm\Delta$) of the current mirror circuit 102, switches at a chop rate, wherein the average of the output signal depends on the desired ambient light signal and the peak-to-peak amplitude depends on the mismatch error. On digitizing the output signal (e.g., by employing ADC 104), in the frequency domain, a tone that is proportional to mismatch error is obtained at the chop frequency. Moreover, the mismatch correction circuit 106 is utilized to detect the tone, identify the mismatch error, and cancel it from the output signal. In one aspect, the amplitude modulator 206 modulates the digitized output signal at the chop frequency (fs/2). The modulated signal is then provided to a digital filter (e.g., low pass filter, integrator, etc.), which reduces the mismatch error until the mismatch error is minimized/eliminated, and stabilizes the feedback loop. In particular, the digital filter 208 selects an appropriate/correct weighting for the metal-oxide-semiconductor field-effect transistors (MOSFETs) in the current mirror circuit 102, such that, the gain of the current mirror is equal to "1" and the chop signal is eliminated. The output of the digital filter 208 is converted back to an analog signal by employing a digital-to-analog convertor (DAC) 210. Although the DAC 210 is depicted to reside outside the mismatch correction circuit 106, it can be appreciated that DAC 210 can be located within the mismatch correction circuit 106. Further, it can be appreciated that most any technique can be utilized to adjust the gain of the current mirror circuit 102. On removing the mismatch error, a maximum dynamic range is available for the ADC 104, since the ADC 104 is processing just the ambient light signal. Accordingly, an inherent improvement in performance is observed.

In one example, if the mismatch correction circuit 106 is not employed, the ADC 104 has to convert the high amplitude chopped wave linearly to a digital signal. In this example scenario, oftentimes, if the amplitude of the output signal is higher than the full-scale value of the ADC 104, the current will overload the ADC 104, resulting in a non-linear system. For example, if the full-scale amplitude value of the ADC 104 is 100 A, the amplitude of the chop signal of the current mirror circuit 102 is 10 A, and if amplitude of the ambient light signal is 95 A, then the total amplitude of the input to the ADC 104 is 105 A, which is greater than the ADC's full-scale value. Thus, the ADC 104 will overload leading to an error in the output and/or lost information. This example scenario can often arise on initiating the calibration and the ADC 104 may clip, due to a very large mismatch. However, the mismatch correction circuit 106 implemented herein identifies the mismatch error based on the frequency content of the digitized signal and not on amplitude value. Accordingly, even if the ADC 104 clips initially, the mismatch error can be accurately removed by system 200. Specifically, the system 200 converges in manner such that the chop amplitude at the output of the current mirror circuit 102 is zero and the output signal provides a signal representing only the ambient light received by the photodiode 202.

Additionally or alternately, in one aspect, system 200 can also be utilized as an IR sensor, by disabling the "ALS+IR" diode 202 (e.g., by disconnecting/opening the connection from the diode 202). Moreover, system 200 can be employed for detecting IR current by measuring/detecting the current from diode 204. Further, the light sensors, diodes 202 and 204, can be included in one or more packages. In one aspect, diodes 202 and 204 can be packaged together in a single device, such as, but not limited to, a cell phone, a laptop, a desktop, a gaming module, etc. For example, system 200 can be included within a backlight setting sensor in a cell phone, a portable computer (e.g., embedded in a monitor), etc. The system 200 can respond to the ambient light (e.g., as detected by a human/user) and a cause a disparate system (e.g., screen brightness control system) to adapt accordingly, for example, dimming in the darkness or increasing brightness in the daytime. Unlike traditional sensors, the light-source IR content is not important since the system 200 cancels out the IR content. As an example, incandescent bulbs emit more IR light than visible light, so an example application for system 200 can include, but is not limited to backlight control of a cell-phone display under a light source that includes an incandescent bulb.

Although, two photodiodes 202, 204, are depicted in FIG. 2, it can be appreciated that most any number of photodiodes, with most ant number of filters can be employed. For example, system 200 can include a first photodiode region that can be covered by an optical filter configured to reject infrared (IR) light and that produces a first current ($I_1$), a second photodiode region that can be covered by a light blocking material configured to reject visible and infrared light and that produces a second current ($I_2$), and/or a third photodiode regions that is not covered by the optical filter and not covered by the light blocking material, and that produces a third current ($I_3$). Additionally, the system 200 can include circuitry configured to produce an output indicative of the first current ($I_1$) or a scaled version of the first current ($I_1$), minus the second current ($I_2$) or a scaled version of the second current ($I_2$), minus the third current ($I_3$) or a scaled version of the third current ($I_3$), as described in detail by U.S. patent application, Ser. No. 12/885,297, filed on Sep. 17, 2010, and entitled "PHOTODETECTORS USEFUL AS AMBIENT LIGHT SENSORS," the entirety of which is incorporated by reference herein.

Figure 3A:
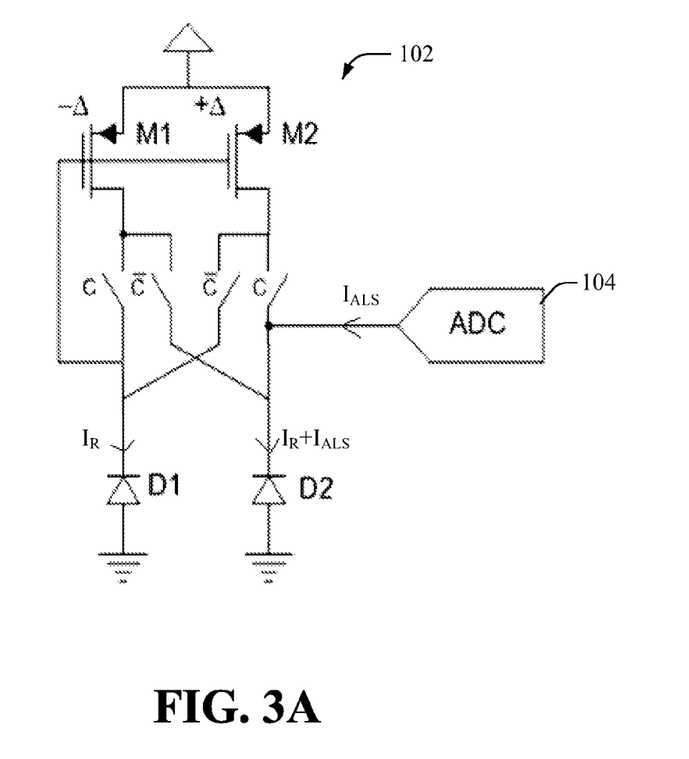
FIG. 3A illustrates an exemplary implementation for a current mirror circuit utilized for analog IR subtraction.

FIG. 3A illustrates an example implementation for the current mirror circuit 102. The circuit includes a primary pair of MOSFETs, M1 and M2, having their sources connected to a supply voltage and their gates connected to an input current from photodiodes D1 and D2. It can be appreciated that a pair of bipolar junction transistors (not shown) can also employed to realize the current mirror circuit 102.

Photodiodes D1 and D2 can be substantially similar to diodes 204 and 202 respectively. Moreover, the current (ID1) generated by D1 (and an optical filter) is proportional to the IR light incident on D1, whereas the current (ID2) generated by D2 (and another optical filter) is proportional to the sum of the ambient light and IR light incident on D2. Ideally (without mismatch) the output current, I, is equal to ID2-ID1 and is proportional to the amount of ambient light incident on D2. However, in practice, due to the mismatch of M1 and M2, a mismatch error is introduced in the output (I) of the current mirror 102. In one aspect, layout techniques can be utilized to reduce first-order mismatch errors due to variations in these process parameters: gate-oxide thickness, lateral diffusion, oxide encroachment, and oxide charge density. However, the mismatch error is not completely eliminated. A current mismatch correction circuit 106 is employed herein to adjust the gains of M1 and/or M2 to eliminate the mismatch error.

Figure 3B:
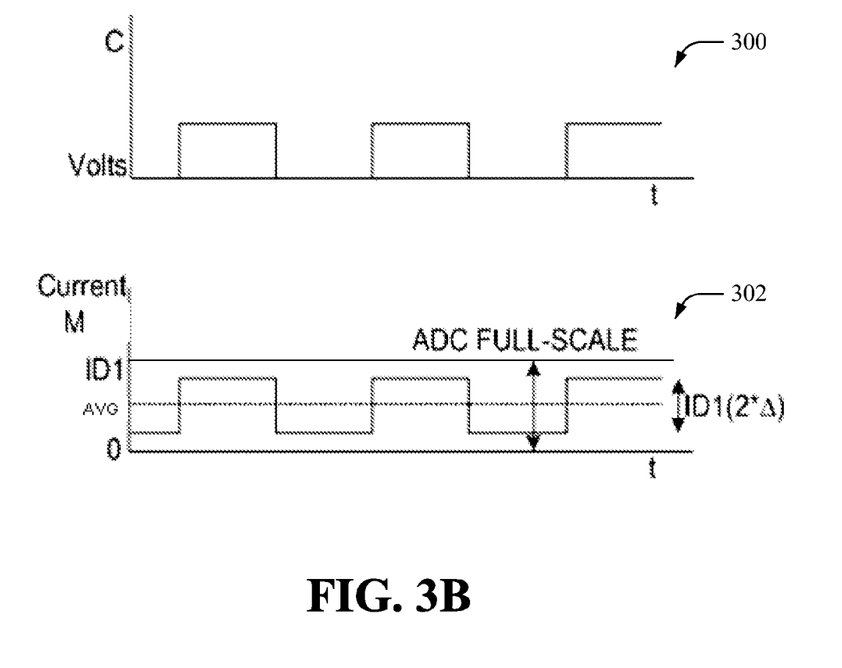
FIG. 3B illustrates an exemplary timing diagrams depicting a chop signal employed by a current mirror circuit and the output current of the current mirror circuit.

FIG. 3B illustrates example timing diagrams 300, 302 of the chop signal and the output current (I) respectively. As shown at 300, the chop signal can be a square wave and typically, operate at a rate higher than the sample rate of the ADC 104. Further, 302 depicts output signal of the current mirror (I), which switches at the chop signal frequency and wherein the average of the signal (I) provides a signal proportional to the ambient light incident on D2. Further, the peak-to-peak amplitude (ID1(2*Δ)) depends on the mismatch error. It can be noted that if the IR current is higher than the ADC full-scale (not shown), the chopper can overload the ADC 104. This can occur when (ID1(2*Δ)+$I_{AB}$)>ADC FULL-SCALE. However, mismatch correction circuit 106 calculates the mismatch error in the frequency domain and thus is not affected by the ADC overload.

Figure 4:
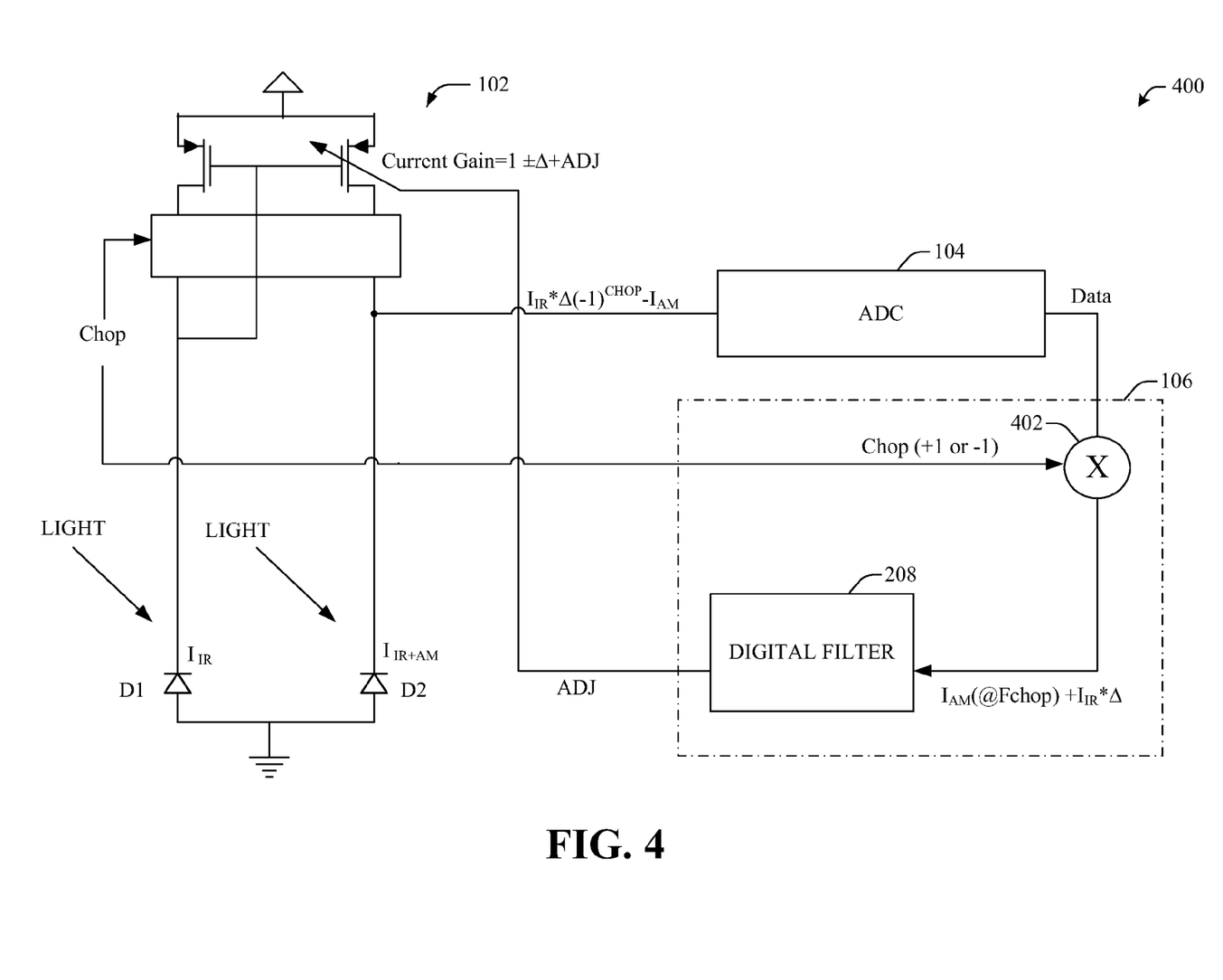
FIG. 4 illustrates an example adaptive IR noise cancellation system.

Referring now to FIG. 4, there illustrated is an example adaptive IR noise cancellation system 400 in accordance with an aspect of the subject innovation. It can be appreciated that the current mirror circuit 102, the ADC 104, the mismatch correction circuit 106, and the digital filter 208, can include functionality, as more fully described herein, for example, with regard to systems 100-300. Further, individual or combinations of elements in FIG. 4 can be combined in one or more integrated circuit (IC) chips.

As noted above, the output of the current mirror includes a mismatch error and is equal to ($I_{IR}*\Delta(-1)^{CHOP}-I_{AM}$. As an example, a +/−1 sequence of ($I_R*\Delta-I_{AM}$, $-I_R*\Delta-I_{AM}$, $I_R*\Delta-I_{AM}$, $-I_R*\Delta-I_{AM}$ ...) can be expressed as $(-1)^M$ where m=0,1,2,3,4,5 ... (to infinity), to generate a pattern with m of −1,+1. This signal is digitized by the ADC 104 and provided to a multiplier 402 that performs amplitude modulation. Moreover, the multiplier 402 can multiply the output of the ADC 104 by a signal at the same rate as the chop frequency (in the current mirror). In one example, to avoid aliasing, during calibration, the chop signal operates at a rate slower than the sample rate of the ADC 104. With the slow chop rate, the error signal now appears in the frequency domain as a signal/tone at the chop rate. Multiplying the output of the ADC with a +1, −1, sequence (or 0,1 sequence) at the chopper rate "amplitude-modulates" the error signal at the chop-frequency down to direct current (DC) frequency (zero frequency). Further, a digital filter 208, for example, a low-pass digital filter or digital integrator, following the multiplier 402 generates an adjustment signal "ADJ" with a sign and magnitude proportional to the mismatch error. The ADJ signal can be converted back to analog by employ a DAC (not shown). Moreover, the ADJ signal can be utilized to fine-tune the gain of the current mirror. For example, the gain of the current mirror can be changed by switching in and out mirror elements as directed by the ADJ signal. The feedback loop continues to generate an appropriate ADJ signal until the chop amplitude is zero and the output of the current mirror provides the ambient light current ($I_{AM}$).

Since the mismatch correction circuit 106 operates in the digital domain it can easily be implemented on or off the IC. Further, the mismatch correction circuit 106 can run at the same rate as the ADC 104 or a different rate (e.g., most any rate at which aliasing does not occur). In addition, the mismatch correction can be performed at most any time, by employing system 400. In one aspect, during calibration, light must be incident on the photodiodes, so that the respective current is produced. Accordingly, in one example, light can be explicitly applied (e.g., by shining light on the circuit) on the diodes D1 and D2, during calibration, such that the mismatch error can be identified and corrected.

Figure 5:
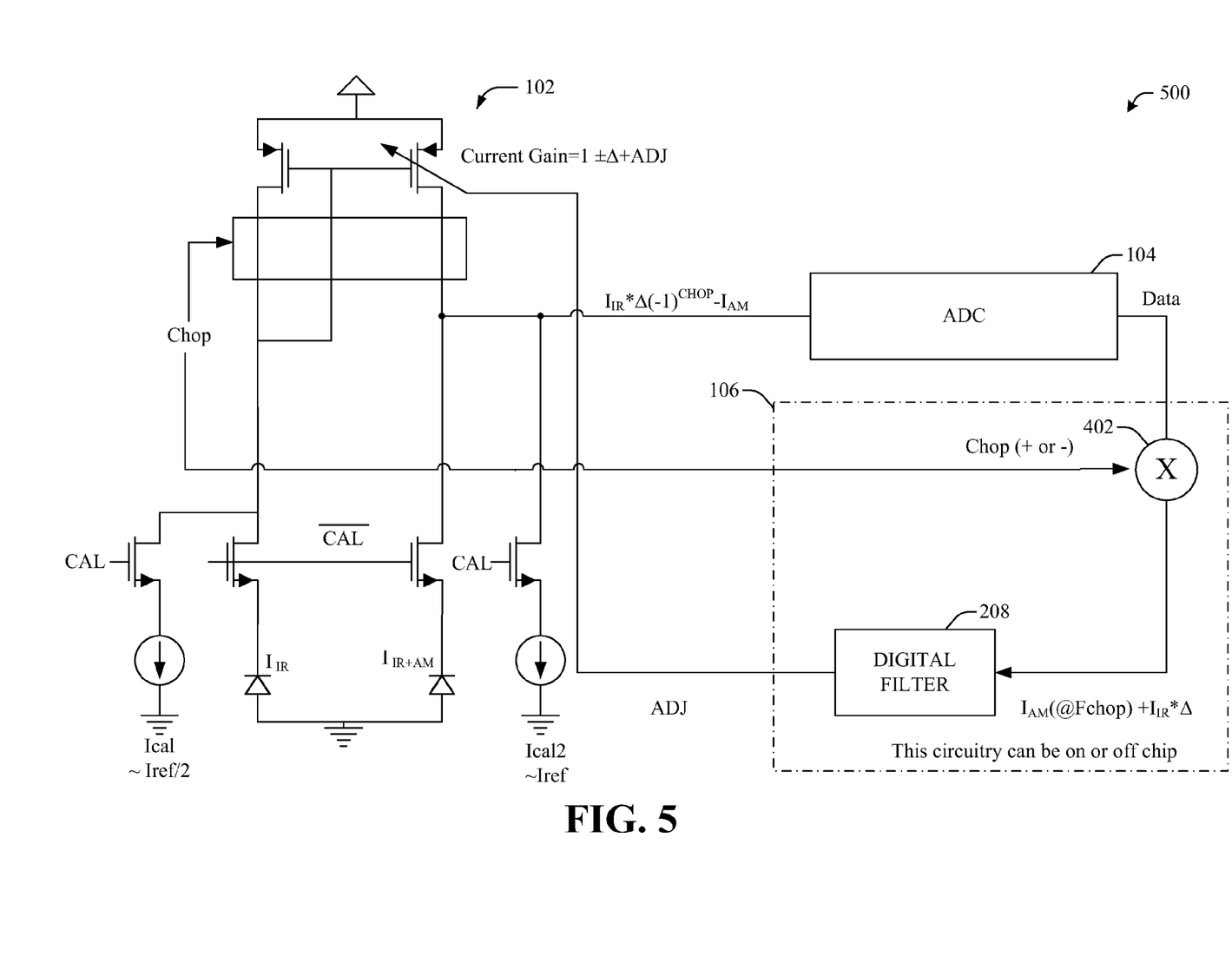
FIG. 5 illustrates an exemplary system for power-up calibration of a current mirror in an ambient light sensor.

FIG. 5 illustrates an example system 500 for power-up calibration of the current mirror in an ambient light sensor, according to an embodiment of the specification. The calibration loop presented in FIG. 5 adjusts the current mirror gain to a value that minimizes the error proportional to IR content. In an aspect, the calibration loop can track out and compensate for manufacturing variations, temperature variations, and/or drift in these variations over time.

System 500 can be operated as follows:
1. Reduce chop frequency to half the sample rate of the ADC 104 or slower
2. Set CAL=1
3. Enable calibration currents, Ical1 and Ical2
4. Set chop=1; Measure data sample at ADC output
5. Set chop=0; Measure data sample at ADC output
6. Identify the difference between both measurements
7. Adjust gain "ADJ" in manner such that the difference is minimized
8. Repeat steps (4-7) until data samples with chop=1 and chop=0 are the same
9. Set CAL=0
10. Set the chop frequency back to normal In this embodiment, the chop signal is initially held high and the conversion is completed, and stored in a register. In the next step, the chop-signal is held low and a second conversion is completed. The results of both the conversions are compared by a digital subtraction circuit (not shown). When the ADC output is independent of the state of the chopping signal the mismatch error is minimized/eliminated. Typically, system 500 can be utilized even in scenarios wherein light cannot be applied to D1 or D2 during calibration. Moreover, the calibration currents, Ical1 and Ical2 do no have to match each other and can employ different (or same) values.

Figure 6:
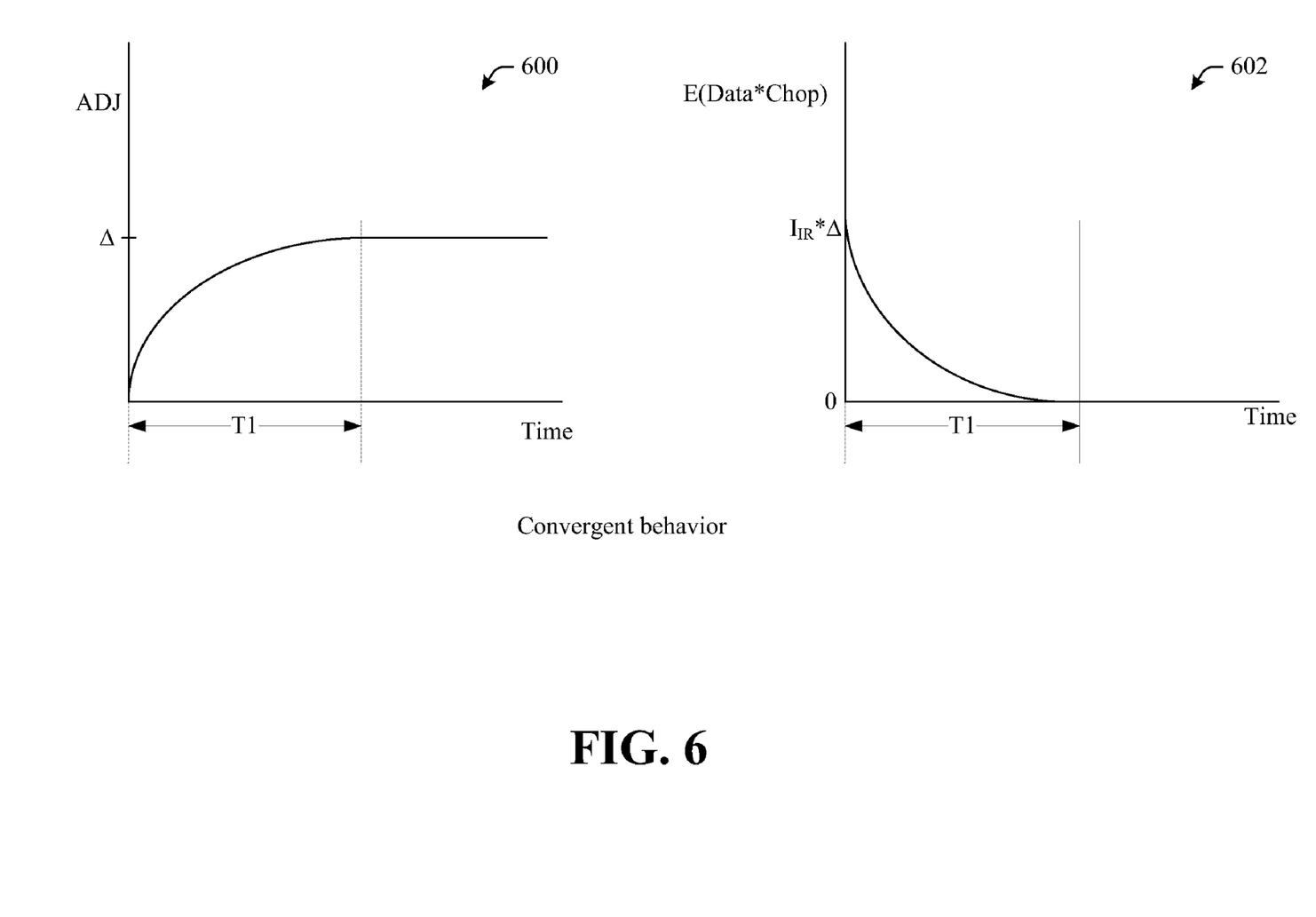
FIG. 6 illustrates exemplary graphs of the convergent behavior of an embodiment of the subject innovation.

FIG. 6 illustrates example timing diagrams of ADJ and the expected value of the modulated data output during convergence. Specifically, 600 depicts the output of the digital filter 208 over time. The digital filter 208 continues to generate update the value of ADJ until ADJ=Δ. Moreover, as ADJ adjusts the gain of the current mirror, the expected value of data *chop reduces and finally at T1, reaches to zero (when ADJ=Δ) as shown at 602.

Figure 7:
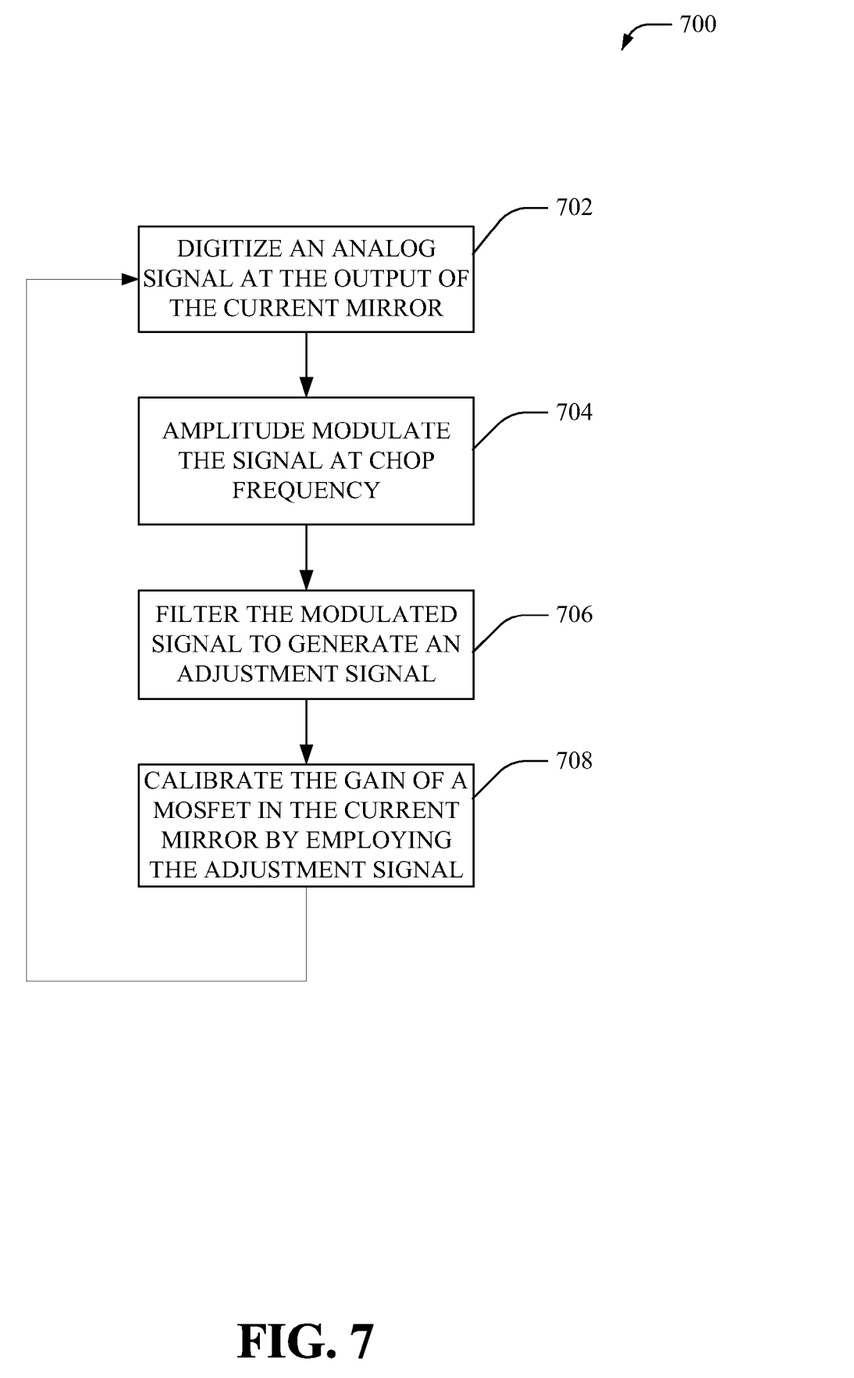
FIG. 7 illustrates an example methodology that facilitates calibration of analog IR subtraction circuit to eliminate errors due to mismatch.

FIG. 7 illustrates a methodology and/or flow diagram in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or computer-readable storage/communications media.

FIG. 7 illustrates an example methodology 700 that facilitates calibration of an analog IR subtraction circuit to eliminate mismatch error. Typically, during ambient light sensing, an analog subtraction of currents ($I_{IR}$ and $I_{IR+AB}$) obtained from two photodiodes is performed by employing a current mirror. The current mirror, however, does not provide an accurate result, since an error is introduced in the output due to the variations in the gain of the current mirror (e.g., introduced during the manufacturing process). Methodology 700 identifies the error in the output and adjusts the gain of the current mirror, such that the error is eliminated/minimized.

At 702, the output of the current mirror is digitized, for example, by employing an ADC. At 704, the digitized signal is amplitude modulated at the chop frequency utilized in the current mirror. In one example, the digitized signal can be multiplied with a +1, −1, sequence (or 0,1 sequence) at the chop frequency. Further, at 706, the modulated signal is filtered to generate an adjustment signal. For example, a digital low pass filter or integrator can be employed for generating the adjustment signal. At 708, the gain of the current mirror is calibrated by employing the adjustment signal. Typically, the adjustment signal can be converted back to an analog signal, which can be utilized to adjust the gain of MOSFET(s) in the current mirror.

Figure 8:
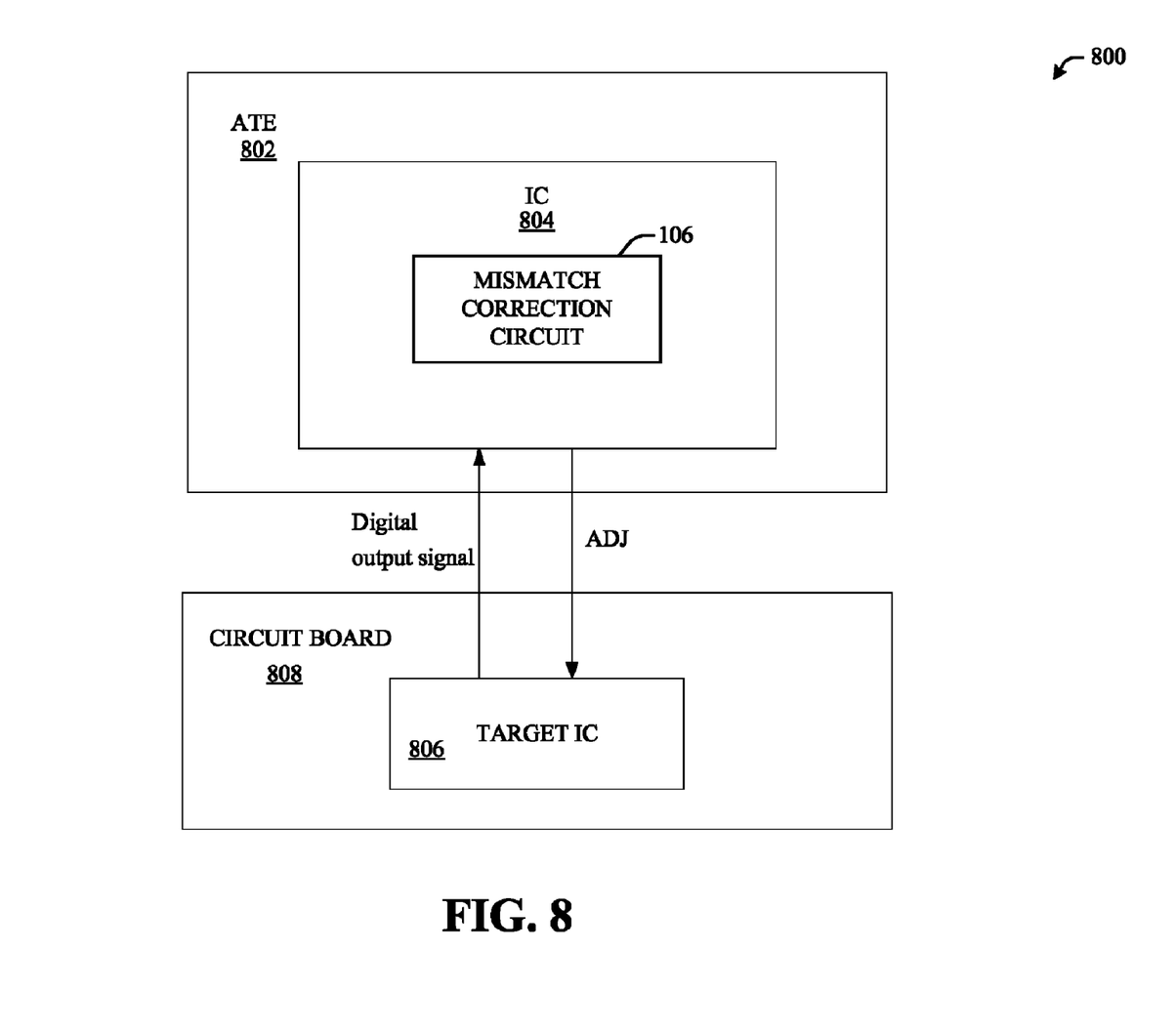
FIG. 8 illustrates an example system in which the embodiments of the present invention can be implemented.

In order to provide additional context for various aspects of the subject specification, FIG. 8 illustrates an example system in which the embodiments of the present invention can be implemented. The system 800 includes Automatic Test Equipment (ATE) 802 that includes an IC 804, which includes the mismatch correction circuit 106, according to an embodiment of the subject innovation. The Target IC 806 is situated on the circuit board 808 and is coupled to the IC 804. In one aspect, the Target IC 806 includes the current mirror circuit 102, the ADC 104 and/or the DAC 210. Specifically, the Target IC 806 is tested by the ATE 802. The mismatch correction circuit 106 can detect the mismatch error in the digital output signal and generate an adjustment signal, which can be employed to calibrate the gain of the current mirror circuit 102 in the Target IC 806 and remove the mismatch error from the output signal. Implementing the mismatch correction circuit 106 on the ATE 802 can reduce hardware on the Target IC 806 and accordingly decrease complexity and costs.

Figure 9:
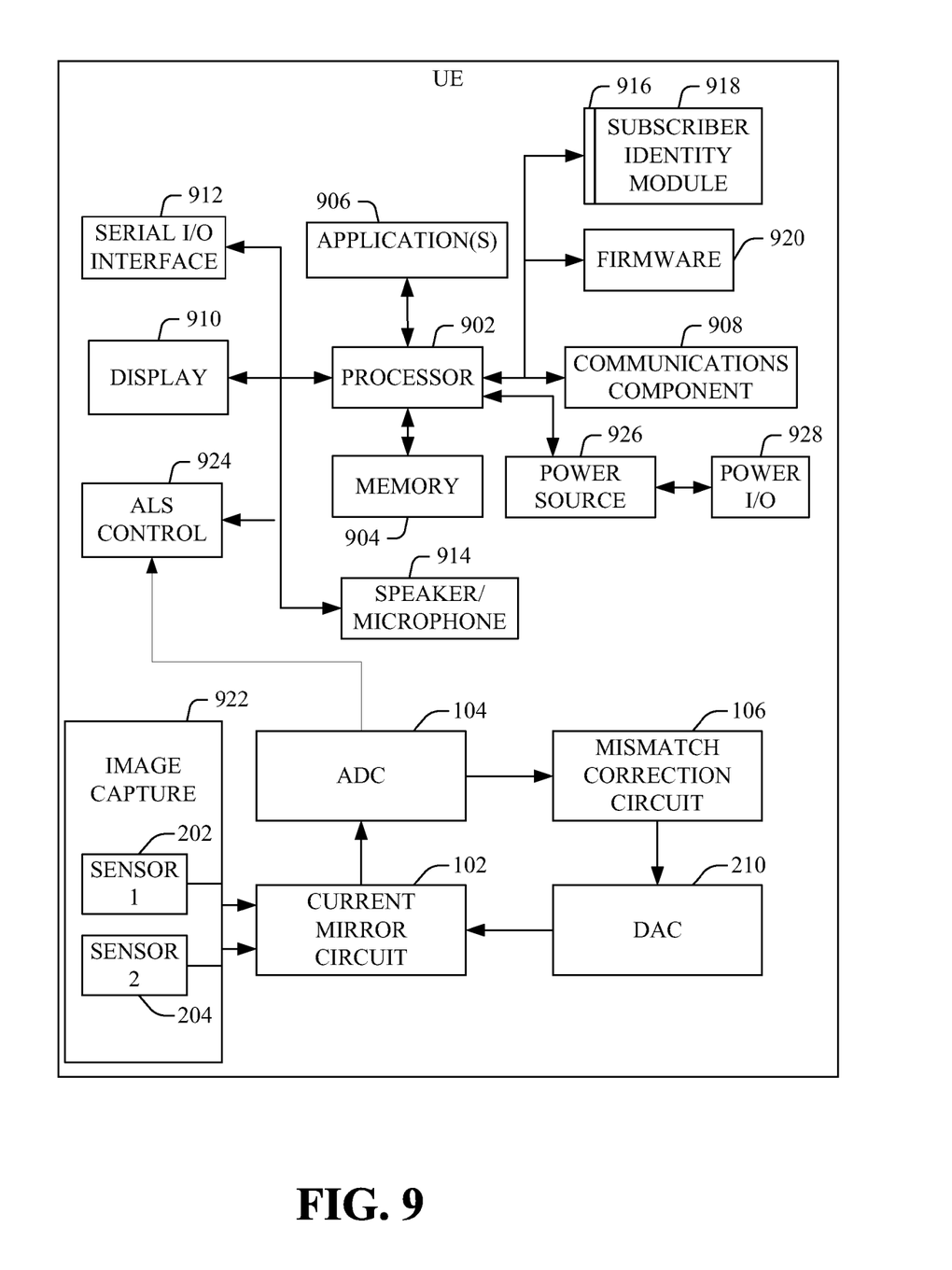
FIG. 9 illustrates a block diagram of a user equipment (UE) suitable for ambient light sensing in accordance with the innovation.

Referring now to FIG. 9, there is illustrated a block diagram of a user equipment (UE) 900 suitable for implementing the disclosed system, in accordance with the innovation. Typically, UE 900 can include most any consumer electronic device employed by a user, such as, but not limited to, a cellular phone, a personal digital assistant (PDA), a laptop, a personal computer, a media player, a gaming console, a media recorder, a tablet, a television, and the like. The UE 900 can include a processor 902 for controlling all onboard operations and processes. A memory 904 can interface to the processor 902 for storage of data and one or more applications 906 being executed by the processor 902. A communications component 908 can interface to the processor 902 to facilitate wired/wireless communication with external systems. The UE 900 can also include a power source 926 in the form of batteries, which power source 926 interfaces to an external power system or charging equipment via a power I/O component 928. Further, serial I/O interface 912 is provided in communication with the processor 902 to facilitate serial communication (e.g., USB, and/or IEEE 1394) via a hardwire connection.

Furthermore, audio capabilities are provided with a speaker/microphone component 914. In addition, the UE 900 can include a slot interface 916 for accommodating a subscriber identity module (SIM) 918. Firmware 920 is also provided to store and provide to the processor 902 startup and/or operational data. In one aspect, the UE 900 can include a display 910 for displaying content downloaded and/or for displaying text information related to operating and using the device features. In one example, the display 910 can be a touch screen. The UE 900 can also include an image capture component 922 such as a camera and/or a video decoder (not shown) for decoding encoded multimedia content. In one example, the image capture component 922 can include sensors 202 and 204 that generate a current ($I_{IR}$) indicative of the IR light incident on sensor 1 202 and a current ($I_{IR+AM}$) indicative of the sum of the IR light and ambient light incident on a sensor 2 (as explained in detail supra). Typically, sensors 202 and 204 can receive light from most any source, including, but not limited to, incandescent bulbs, florescent lights, sun, etc. In one aspect, sensor 202 can detect visible and IR light and the sensor 204 can detect only IR light (e.g., by employing appropriate optical filters).

In addition, the UE 900 can include a network current mirror circuit 102, ADC 14, mismatch correction circuit 106, and DAC 210, which can include respective functionality, as more fully described herein, for example, with regard to systems 100, 200, and 400-600. According to an embodiment, an ALS control component 924 can receive a signal indicative of the ambient light incident at the UE 900 (e.g., signal representing the incident ambient light is output by the current mirror circuit 102 and digitized by the ADC 104), and control various components in the UE 900 based on the signal. For example, the ALS control component 924 can adjust settings (e.g., brightness control, contrast, etc.) of the display 912 or backlight, switch off power source 926, modify parameters for image capture component 922 (e.g., focal length, aperture setting, f-stops, exposure time, etc.).

What has been described above includes examples of the subject disclosure. It is, of course, not possible to describe every conceivable combination of components or methodologies for purposes of describing the subject matter, but one of ordinary skill in the art may recognize that many further combinations and permutations of the subject disclosure are possible.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems/circuits/modules have been described with respect to interaction between several components. It can be appreciated that such systems/circuits/modules and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A light measurement apparatus, comprising:
   a first sensor that senses light and generates a first current indicative of the light sensed by the first sensor;
   a second sensor that senses light and generates a second current indicative of the light sensed by the second sensor;
   an analog circuit that subtracts the first current from the second current to produce a third current that is equal to the first current minus the second current +/− an error resulting from a mismatch error associated with the analog circuit;
   an analog-to-digital converter that converts the third current to a digitized version of the third current; and
   a calibration circuit that produces an adjustment signal in dependence on the digitized version of the third current;
   wherein the adjustment signal produced by the calibration circuit is used to reduce the mismatch error associated with the analog circuit that subtracts the first current from the second current to produce the third current.

2. The light measurement apparatus of claim 1, wherein the analog circuit includes a current mirror circuit.

3. The light measurement apparatus of claim 2, wherein the adjustment signal produced by the calibration circuit is used to reduce the mismatch error associated with the analog circuit by adjusting a gain of the current mirror circuit.

4. The light measurement apparatus of claim 1, wherein:
   the analog circuit performs chopping at a chop frequency;
   the calibration circuit identifies, in dependence on the digitized version of the third current, a tone at the chop frequency that is proportional to the mismatch error associated with the analog circuit; and
   the calibration circuit produces the adjustment signal in dependence on the identified tone at the chop frequency that is proportional to the mismatch error associated with the analog circuit.

5. The light measurement apparatus of claim 4, wherein the calibration circuit performs amplitude modulation on the digitized version of the third current.

6. The light measurement apparatus of claim 5, wherein the calibration circuit includes a multiplier that multiplies the digitized version of the third current by a sequence at the chop frequency.

7. The light measurement apparatus of claim 6, wherein the sequence comprises one of a −1, 1 sequence, or a 0, 1 sequence.

8. The light measurement apparatus of claim 5, wherein the calibration circuit further comprises a digital filter that generates the adjustment signal based on a result of the amplitude modulation, wherein the adjustment signal is employed to modify a gain of the analog circuit.

9. The light measurement apparatus of claim 8, wherein the digital filter is at least one of a digital integrator or a digital low pass filter.

10. The light measurement apparatus of claim 1, further comprising: a digital-to-analog convertor (DAC) that converts the adjustment signal to an analog signal that is used to reduce the mismatch error associated with the analog circuit that subtracts the first current from the second current to produce the third current.

11. The light measurement apparatus of claim 10, wherein the analog signal is employed to modify a gain of at least one metal-oxide-semiconductor field-effect transistor (MOSFET) within the analog circuit.

12. The light measurement apparatus of claim 1, wherein the calibration circuit is employed at least one of during system operation, prior to system operation, during product testing, during power-up, in the background, periodically, or on-demand.

13. The light measurement apparatus of claim 1, wherein the calibration circuit and the analog circuit reside on at least one of disparate Integrated circuit (IC) chips or disparate packages.

14. A method comprising:
   generating a first current indicative of an amount of a first sensed light;
   generating a second current indicative of an amount of a second sensed light;
   subtracting the first current from the second current using an analog circuit to produce a third current that is equal to the first current minus the second current +/− an error resulting from a mismatch error associated with the analog circuit;

converting the third current to a digitized version of the third current producing an adjustment signal in dependence on the digitized version of the third current; and adjusting a gain of the analog circuit, in dependence on the adjustment signal, to reduce the mismatch error associated with the analog circuit.

15. The method of claim 14, wherein the producing an adjustment signal includes amplitude modulating the digitized version of the third current at a chop frequency to generate an amplitude modulated signal having a tone at the chop frequency that is indicative of the mismatch error associated with the analog circuit, wherein the chop frequency is a frequency utilized by a chopper in the analog circuit.

16. An apparatus comprising:

an analog current subtraction circuit including a current mirror circuit for generating an analog output signal based on a subtraction of a first current from a second current, wherein the first current is indicative of an amount of a sensed infrared (IR) light, the second current is indicative of a sum of an amount of sensed IR and an amount of sensed ambient visible light, and the analog output signal is equal to the first current minus the second current +/− an error resulting from a mismatch error associated with the analog current subtraction circuit;

an analog-to-digital convertor (ADC) for converting the analog output signal to a digital output signal; and a mismatch correction circuit for generating, in dependence on the digital output signal, an adjustment signal for adjusting a gain of the current mirror circuit to reduce the error in the analog output signal resulting from the mismatch error associated with the analog current subtraction circuit.

17. The apparatus of claim 16, wherein the mismatch correction circuit comprises:

a modulator circuit that performs amplitude modulation on the digital output signal; and a digital filter that filters an output of the modulator to generate the adjustment signal.

18. The apparatus of claim 16, wherein the apparatus comprises at least one of a mobile phone, a personal digital assistant (PDA), a tablet, a personal computer (PC), a laptop, a media player, a gaming module, a television, or a media recorder.

19. The apparatus of claim 18, further comprising: a control component that adjusts at least one of a parameter or a function of the apparatus based at least in part on at least one of the analog output signal or the digital output signal.

* * * * *

UNITED STATES PATENT AND TRADEMARK OFFICE
CERTIFICATE OF CORRECTION

PATENT NO.         : 8,242,430 B2                                                Page 1 of 1
APPLICATION NO.    : 12/987394
DATED              : August 14, 2012
INVENTOR(S)        : K. Dyer It is certified that error appears in the above-identified patent and that said Letters Patent is hereby corrected as shown below:

At column 13, line 2 (claim 14, line 12), change "third current" to -- third current; --

Signed and Sealed this
Twenty-seventh Day of November, 2012

David J. Kappos
*Director of the United States Patent and Trademark Office*